United States Patent
Shundo et al.

(10) Patent No.: US 10,543,916 B2
(45) Date of Patent: Jan. 28, 2020

(54) SOFT IN-PLANE AND STIFF OUT-OF-PLANE ROTOR SYSTEM

(71) Applicant: BELL HELICOPTER TEXTRON INC., Fort Worth, TX (US)

(72) Inventors: Ken Shundo, Keller, TX (US); Mithat Yuce, Argyle, TX (US); Frank B. Stamps, Colleyville, TX (US)

(*) Notice: Subject to any disclaimer, the term of this patent is extended or adjusted under 35 U.S.C. 154(b) by 39 days.

(21) Appl. No.: 15/603,019

(22) Filed: May 23, 2017

(65) Prior Publication Data
US 2017/0259916 A1   Sep. 14, 2017

Related U.S. Application Data

(63) Continuation of application No. 13/804,832, filed on Mar. 14, 2013, now Pat. No. 9,656,747.

(51) Int. Cl.
| | |
|---|---|
| *B64C 27/80* | (2006.01) |
| *B64C 27/52* | (2006.01) |
| *B64C 27/10* | (2006.01) |
| *B64C 27/32* | (2006.01) |
| *B64C 27/35* | (2006.01) |
| *B64C 27/48* | (2006.01) |
| *B64C 27/51* | (2006.01) |

(52) U.S. Cl.
CPC .............. *B64C 27/80* (2013.01); *B64C 27/10* (2013.01); *B64C 27/322* (2013.01); *B64C 27/35* (2013.01); *B64C 27/48* (2013.01); *B64C 27/51* (2013.01); *B64C 27/52* (2013.01)

(58) Field of Classification Search
CPC ....... B64C 27/10; B64C 27/322; B64C 27/48; B64C 27/51; B64C 27/52; B64C 27/80; B64C 27/35

USPC .............................. 416/134 A, 143, 141, 138
See application file for complete search history.

(56) References Cited

U.S. PATENT DOCUMENTS

| | | | |
|---|---|---|---|
| 3,554,467 A | 1/1971 | Yowell | |
| 3,942,910 A * | 3/1976 | Snyder | .................... B64C 27/32 416/135 |
| 3,999,726 A | 12/1976 | Carlson et al. | |
| 4,257,738 A | 3/1981 | Schwarz et al. | |

(Continued)

FOREIGN PATENT DOCUMENTS

| | | |
|---|---|---|
| DE | 2827320 A1 | 10/1980 |
| DE | 2827320 C2 | 10/1980 |

OTHER PUBLICATIONS

European Search Report dated Jun. 19, 2013 in related EP App. No. 13166910.3.

(Continued)

*Primary Examiner* — Christopher S Bobish
(74) *Attorney, Agent, or Firm* — James E. Walton

(57) ABSTRACT

A rotor assembly includes a yoke operably associated with a rotor blade. The yoke includes a first device and a second device that attach the rotor blade to the yoke. The first device is configured to allow transverse movement of the rotor blade about a chord axis and rotational movement about a pitch-change axis. The second device is configured to allow rotational movement of the rotor blade solely about the pitch-change axis. The method includes rotating rotor assembly about a first plane of rotation, while retaining a relatively stiff out-of-plane rotation and a relatively soft in-plane rotation during flight.

18 Claims, 7 Drawing Sheets

(56) References Cited

U.S. PATENT DOCUMENTS

| | | | | |
|---|---|---|---|---|
| 4,257,739 A | * | 3/1981 | Covington | B64C 27/35 |
| | | | | 416/134 A |
| 4,342,540 A | * | 8/1982 | Lovera | B64C 27/35 |
| | | | | 416/107 |
| 4,352,632 A | | 10/1982 | Schwarz et al. | |
| 4,473,199 A | | 9/1984 | Magill | |
| 4,512,717 A | | 4/1985 | Pancotti et al. | |
| 4,516,909 A | | 5/1985 | Caramaschi et al. | |
| 4,547,127 A | | 10/1985 | Frommlet et al. | |
| 4,676,720 A | * | 6/1987 | Niwa | B64C 27/51 |
| | | | | 416/134 A |
| 5,059,094 A | | 10/1991 | Robinson et al. | |
| 5,562,416 A | | 10/1996 | Schmaling et al. | |
| 7,252,479 B2 | * | 8/2007 | Bagai | B64C 27/10 |
| | | | | 416/223 R |
| 8,231,346 B2 | | 7/2012 | Stamps et al. | |
| 8,444,382 B2 | | 5/2013 | Stamps et al. | |
| 8,857,581 B2 | | 10/2014 | Stamps et al. | |
| 8,956,117 B2 | | 2/2015 | Stamps et al. | |
| 2011/0027083 A1 | * | 2/2011 | Stamps | B64C 27/51 |
| | | | | 416/107 |
| 2011/0274548 A1 | * | 11/2011 | Stamps | B64C 27/33 |
| | | | | 416/174 |
| 2013/0084183 A1 | | 4/2013 | Yuce et al. | |

OTHER PUBLICATIONS

Office Action dated Oct. 18, 2013 in related EP App. No. 13166910.3.

Office Action dated Feb. 26, 2014 in related EP App. No. 13166910.3.

Non-Final Rejection dated Mar. 7, 2016 from corresponding U.S. Appl. No. 13/804,832.

Amendment dated Jun. 7, 2016 from corresponding U.S. Appl. No. 13/804,832.

Non-Final Rejection dated Sep. 9, 2016 from corresponding U.S. Appl. No. 13/804,832.

Amendment dated Dec. 9, 2016 from corresponding U.S. Appl. No. 13/804,832.

Notice of Allowance dated Jan. 18, 2017 from corresponding U.S. Appl. No. 13/804,832.

* cited by examiner

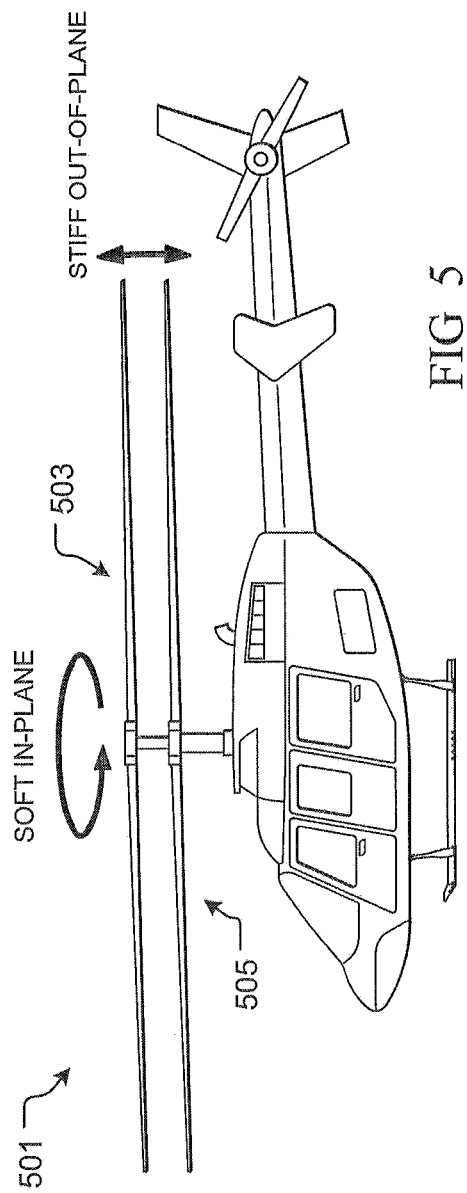
FIG 5
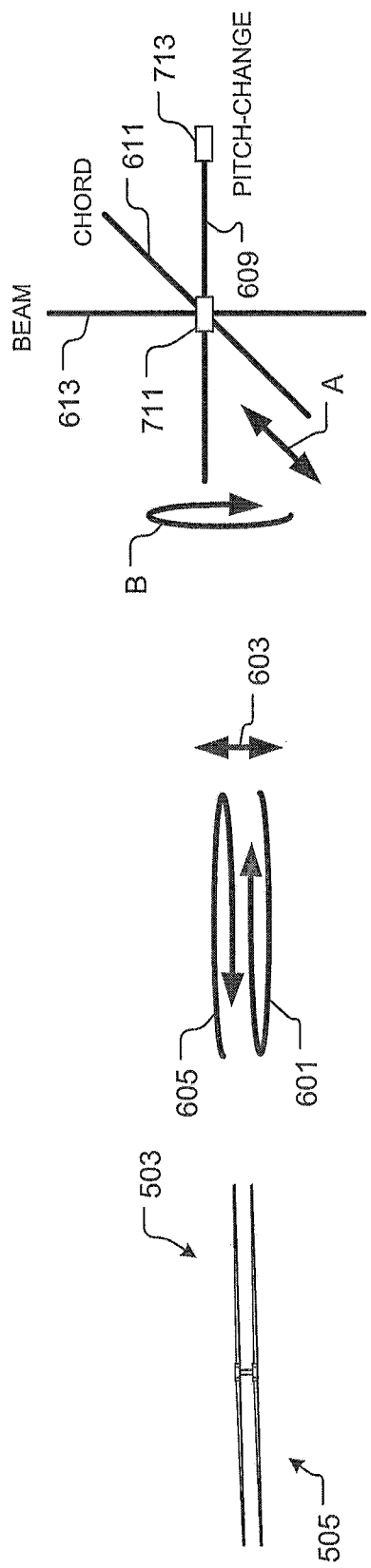
FIG. 6C
FIG. 6B
FIG. 6A

SOFT IN-PLANE AND STIFF OUT-OF-PLANE ROTOR SYSTEM

BACKGROUND

1. Field of the Invention

The present application relates generally to rotor systems, and more specifically, to coaxial rotor systems.

2. Description of Related Art

Rotor systems are well known in the art for effectively creating lift for an aircraft. Conventional rotor systems include one or more rotor blades operably associated with a yoke, and in some embodiments, include two rotor assemblies coaxially aligned. For example, FIG. 1 illustrates a coaxial rotor aircraft 101 having a first rotor assembly 103 coaxially aligned with a second rotor assembly 105. During flight, the rotor assemblies are configured to remain relatively stiff in the in-plane rotation and stiff in the out-of-plane rotation. This feature prevents the rotor assemblies from coming into contact with each other.

FIG. 2 illustrates an exemplary cross-sectional view of a conventional rotor system 201 having two coaxially aligned rotor assemblies 203 and 205. In this embodiment, the rotor blades 207 attach directly to the yoke 209 via one or more roller bearings 211 that allow solely rotational movement about the pitch-change axis and limits movement about both the chord axis and the beam axis. Thus, system 201 effectively creates a stiff in-plane and a stiff out-of-plane rotational movement during flight.

Considerable shortcoming remains with conventional rotor systems configured with stiff in-plane and out-of-plane rotation. For example, a rotor system that is configured to have a stiff in-plane rotation greatly reduces the ability of the rotor system to compensate for in-plane loads exerted on the yoke via the rotor blades during flight, e.g., lead/lag movement of the rotor blade.

Although the foregoing developments in rotor systems represent great strides in the art, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 3-5 are side and perspective view of different rotary aircraft utilizing the rotor system in accordance with the preferred embodiment of the present application;

FIGS. 6A-6C are schematic vies of rotational planes and axes of the rotor system of FIGS. 3-5;

Figure 1:
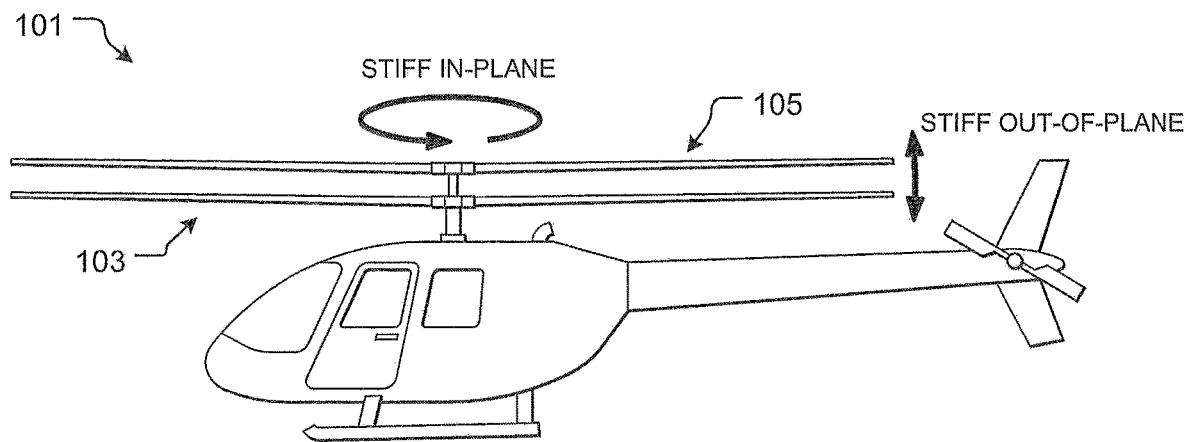
FIG. 1 is a perspective view of a conventional aircraft.
Figure 2:
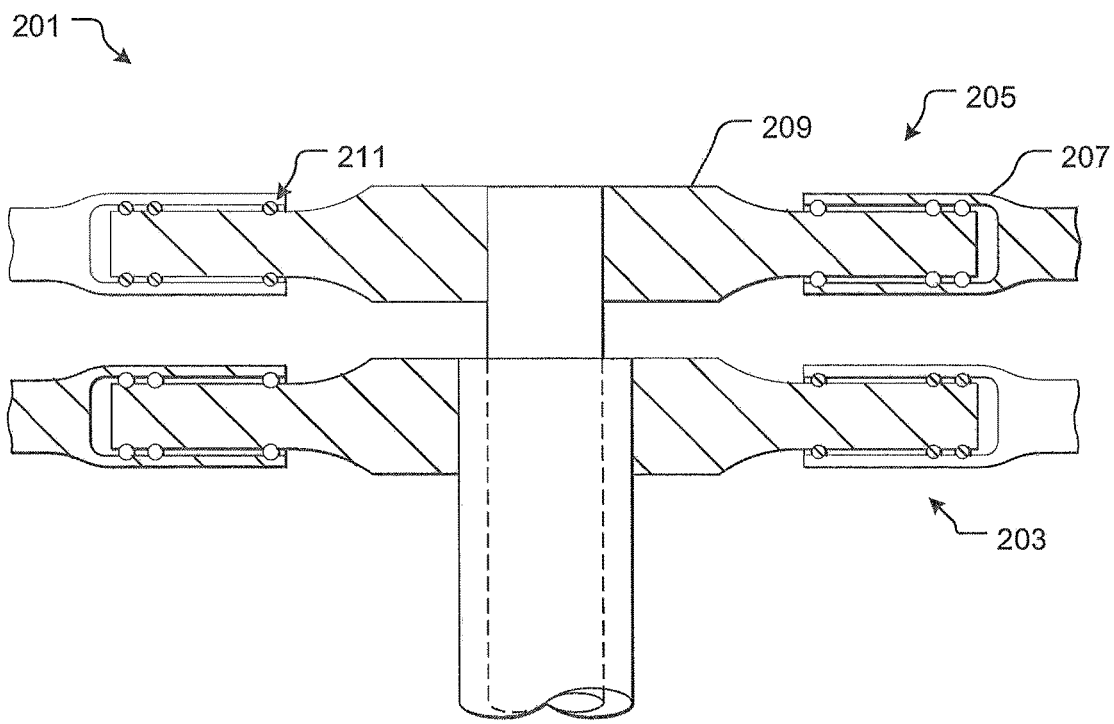
FIG. 2 is a cross-sectional side view of a coaxial rotor system.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcome the above-listed problems commonly associated with conventional dampers. Specifically, the system includes a rotor assembly having a yoke operably associated with a rotor blade. The yoke includes a first device and a second device that attach the rotor blade to the yoke. The first device is configured to allow transverse movement of the rotor blade about a chord axis and rotational movement about a pitch-change axis. The second device is configured to allow rotational movement of the rotor blade solely about the pitch-change axis. The method includes rotating rotor assembly about a first plane of rotation, while retaining a relatively stiff out-of-plane rotation and a relatively soft in-plane rotation during flight. The system provides significant advantages and a further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 3:
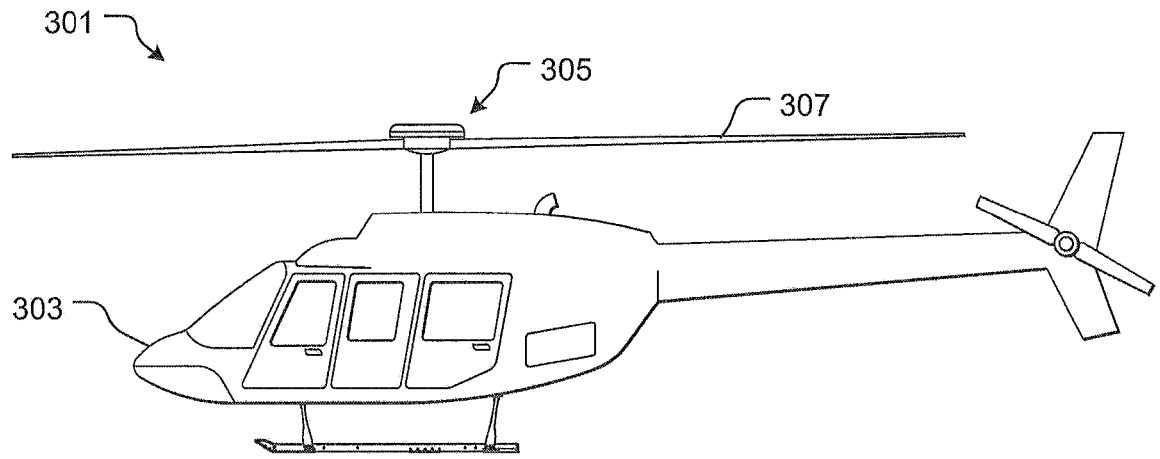

Referring now to the drawings wherein like reference characters identify corresponding or similar elements throughout the several views, FIG. 3 depicts an aircraft 301 in accordance with a preferred embodiment of the present application. In the exemplary embodiment, aircraft 301 is a helicopter having a fuselage 303 and a rotor system 305 carried thereon. A plurality of rotor blades 307 is operably associated with rotor system 305 for creating flight.

Figure 4:
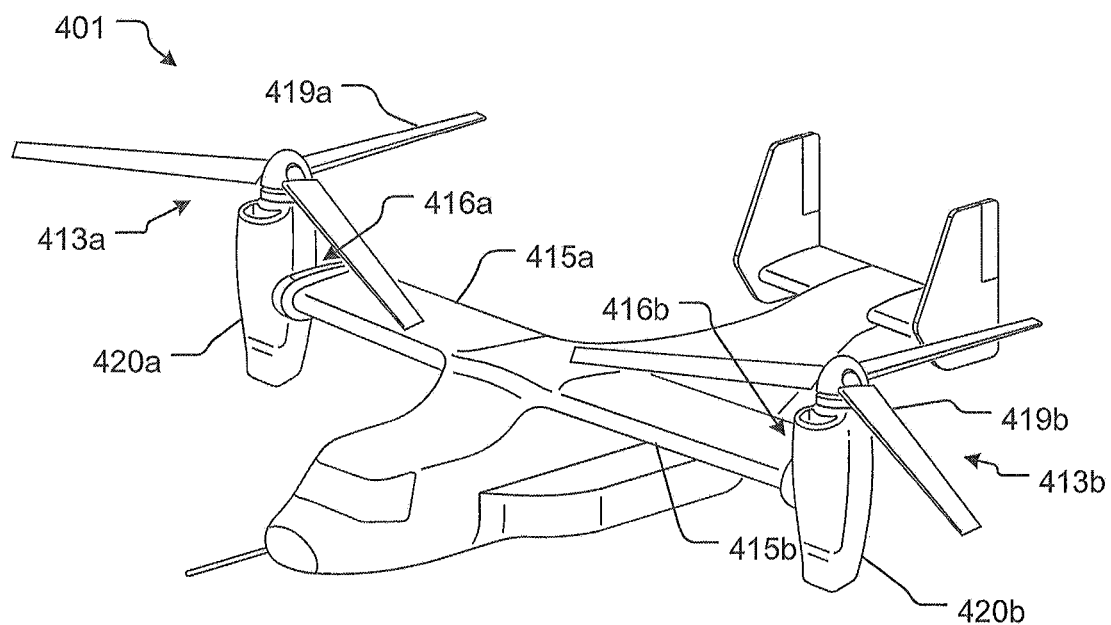

Although shown associated with a helicopter, it will be appreciated that the damper system of the present application could also be utilized with different types of rotary aircraft and vehicles. For example, FIG. 4 illustrates a tiltrotor aircraft 401 and FIG. 5 illustrates a coaxial rotor aircraft 501, both being adapted to utilize the rotor system in accordance with the present application. Further aircraft embodiments could include both manned, unmanned aircraft and/or hybrids thereof.

Tiltrotor aircraft 401 includes rotor assemblies 413a and 413b that are carried by wings 415a and 415b, and are disposed at end portions 416a and 416b of wings 415a and 415b, respectively. Tilt rotor assemblies 413a and 413b include nacelles 420a and 420b, which carry the engines and transmissions of tilt rotor aircraft 401, as well as, rotor proprotors 419a and 419b on forward ends 421a and 421b of tilt rotor assemblies 413a and 413b, respectively. Tilt rotor assemblies 413a and 413b move or rotate relative to wing members 415a and 415b between a helicopter mode in which tilt rotor assemblies 413a and 413b are tilted upward, such that tilt rotor aircraft 401 flies like a conventional helicopter; and an airplane mode in which tilt rotor assemblies 413a and 413b are tilted forward, such that tilt rotor aircraft 401 flies like a conventional propeller driven aircraft.

Rotary aircraft 501 is substantially similar in form and function to aircraft 301 except, for example, two coaxial rotor assemblies 503 and 505 in lieu of a single rotor assembly. In the contemplated embodiment, the two rotor assemblies counter-rotate relative to each other and are driven by two separate rotor shafts operably associated with a common transmission. Thus, it should be appreciated that the features discussed herein are operably associated with rotor systems having one or more rotor assemblies.

FIGS. 6A-6C are schematic views depicting the planes of rotation and axes of the rotor systems discussed herein. During flight, the rotor blade 307 rotates about in-plane 601. It should be understood that the rotor blade 307 tend to bend in the out-of-plane 603 during flight. The blades of a coaxial rotor system are selectively positioned and designed so as to avoid collision with a second rotor blade coaxially aligned and rotating in a second in-plane 605 relatively parallel with in-plane 601.

As depicted, the axes associated with rotor blade 307 are a pitch-change axis 609 that runs along the longitudinal length of the blade, a chord axis 611 extending perpendicular to the pitch-change axis 609, and a beam axis 613 that extend parallel to the rotor mast. In the contemplated embodiment, the rotor system is configured to allow relative transverse movement of the rotor blade about chord axis 611, as indicated by arrow A, and relative rotational movement about pitch-change axis 609, as indicated by arrow B. With respect to beam axis 613, the rotor system is configured to restrict relative movement about this axis so as to prevent collision between the two coaxially aligned rotating blades.

Figure 7:
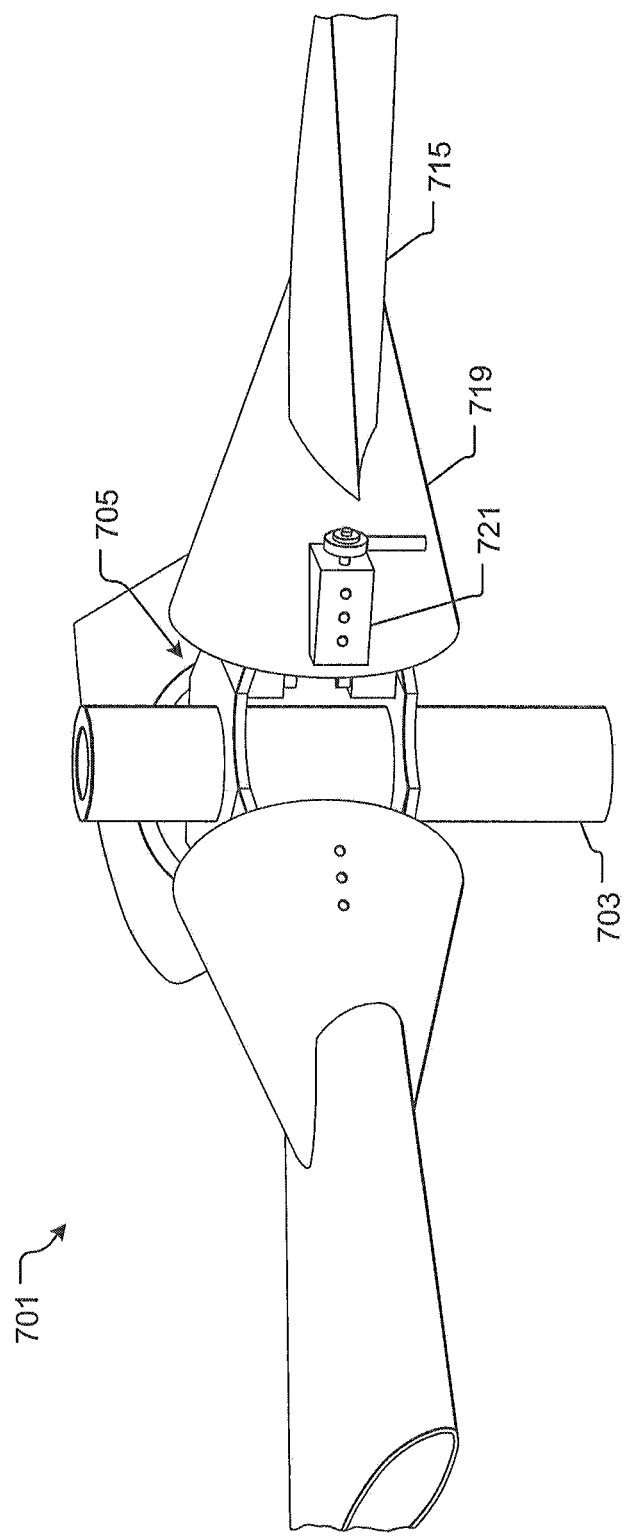
FIGS. 7 and 8 are side views of the rotor system of FIGS. 3-5.
Figure 8:
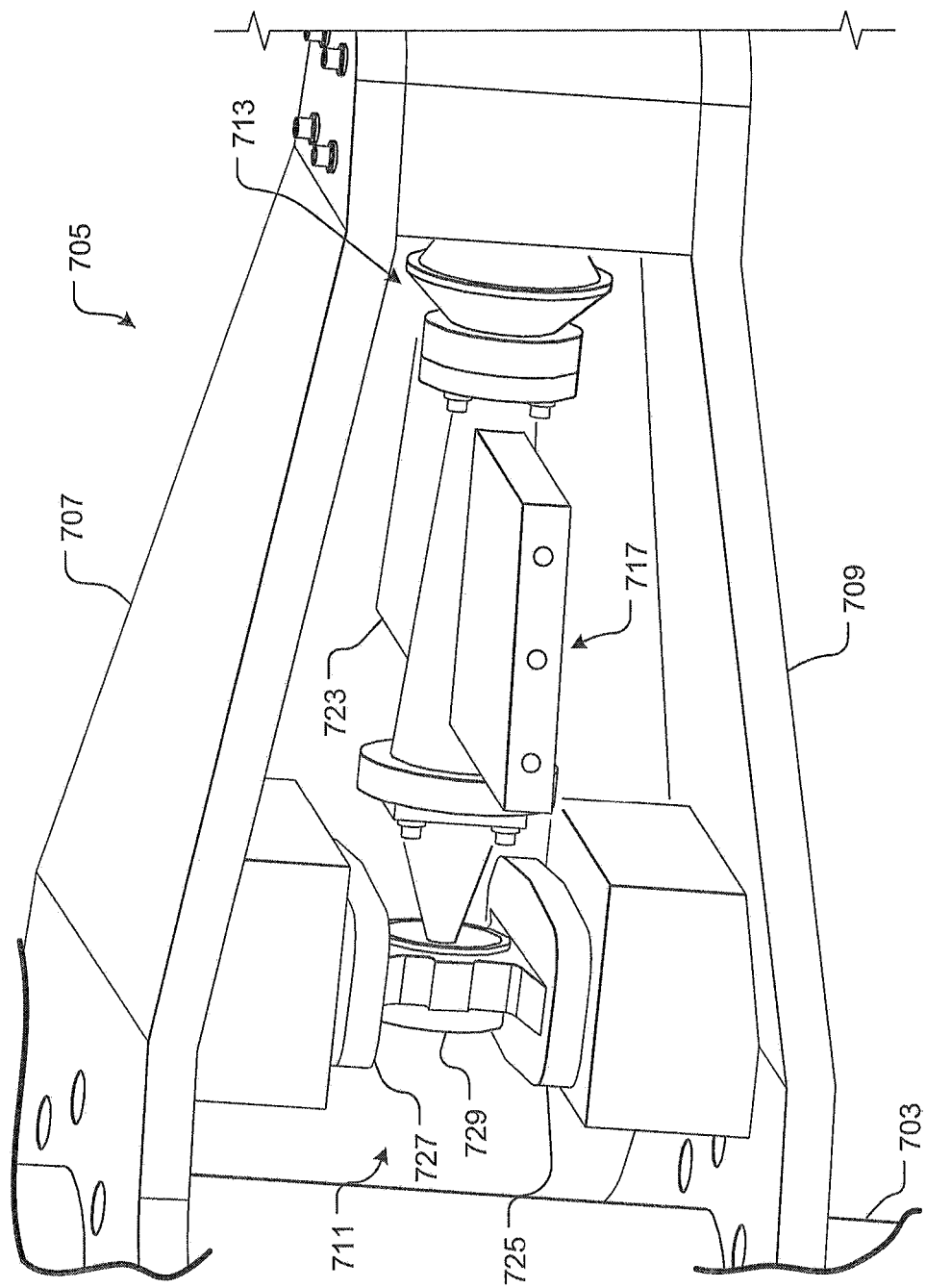
Figure 9:
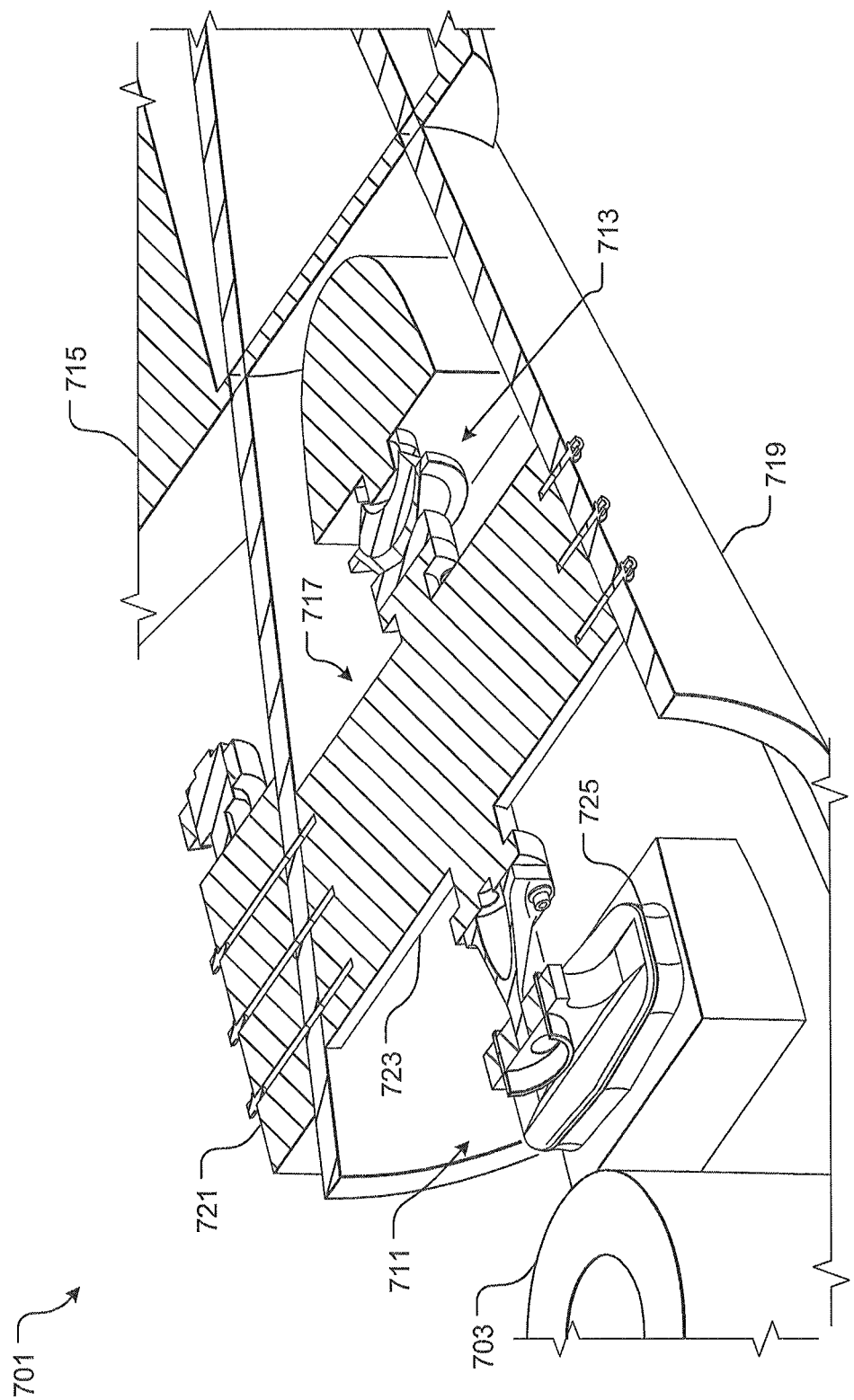
FIG. 9 is a perspective cross-sectional view of the rotor system of FIG. 8.

FIGS. 7-9 depict partial views of the rotor system 701 in accordance with the preferred embodiment. It will be appreciated that the one or more of the features of system 701 are hereby incorporated in the rotor systems discussed above.

Rotor system 701 includes a mast 703 rotatably attached to a transmission (not shown) and to a yoke 705. In the contemplated embodiment, yoke 705 includes an upper arm 707 and a lower arm 709. Positioned between the arms are two devices, namely, first device 711 aligned with a second device 713 about the pitch-change axis. The devices are configured to attach a rotor blade 715 to yoke 705 and also configured to dampen forces exerted against the yoke via the rotor blade.

As depicted in FIGS. 8 and 9, a spindle 717 is attached to and disposed between first device 711 and second device 713. Spindle 717 attaches to a cuff 719 that extends at least partially around the arms of yoke 705 and is configured to attach directly to blade 715. A pitch horn 721 attaches to spindle 717 via a member 723.

Thus, in the contemplated embodiment, cuff 719 is free to rotate around arms 707 and 709 about the pitch-change axis and is configured to attach rotor blade 715 to yoke 705 via devices 711 and 713.

In the contemplated embodiment, first device 711 is a damper, preferably a lead/lag damper that compensates for lead/lag and/or other in-plane forces. In FIGS. 8 and 9, system 701 is shown having a first elastomeric pad 725 secured to lower arm 709 and a second elastomeric pad 727 secured to upper arm 707. Disposed between the elastomeric pads is a radial bearing 729. Thus, in the contemplated embodiment, device 711 includes a radial bearing 729 that allows for rotational movement about the pitch-change axis and elastomeric pads 725 and 727, which allow for transverse movement along the chord axis.

In the contemplated embodiment, second device 713 is a damper, preferably a centrifugal damper that compensates for centrifugal forces exerted on the yoke via the rotor blade. It should be understood that device 713 restricts relative movement along all axes except for rotational movement along the pitch-change axis.

One unique feature believed characteristic of the present application is utilizing the first and second devices to restrict movement of the rotor blade during flight. Thus, the first and second devices are configured to allow soft in-plane rotation and configured to restrict out-of-plane movement. This feature overcomes problems commonly associate with conventional stiff in-plane/out-of-plane designs that experience significant in-plane loads.

Figure 10:
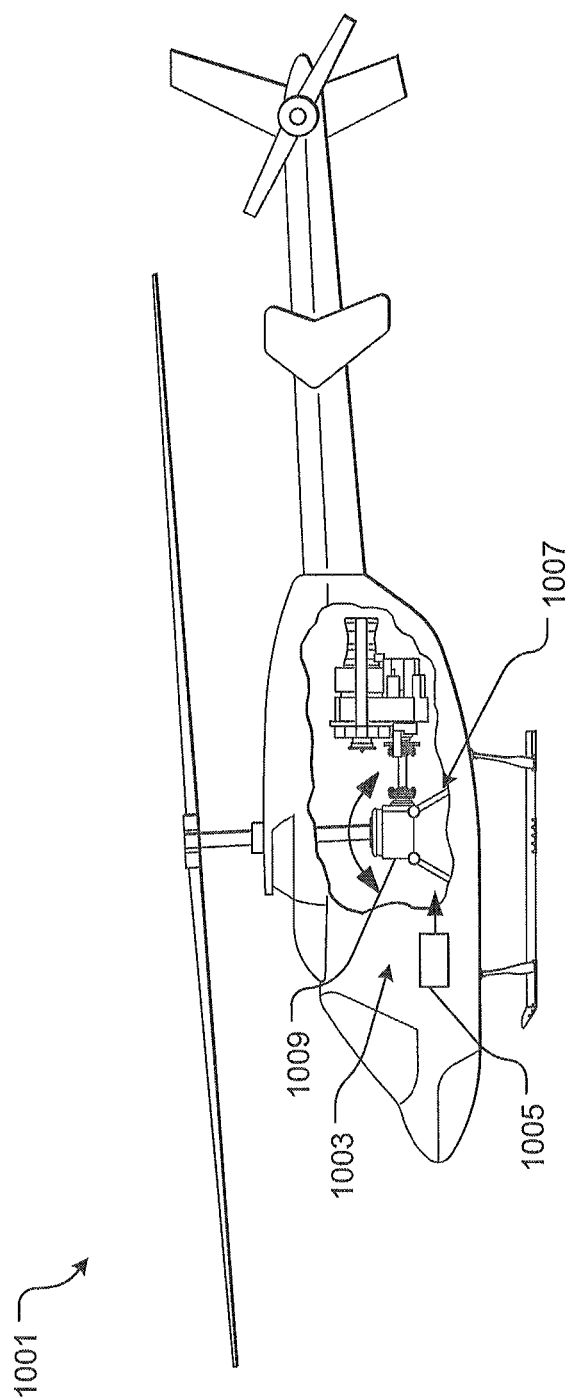
FIG. 10 is a side view of an alternative embodiment of the rotary aircraft of FIG. 3.

Another unique feature believed characteristic of the present application is pivoting the rotor system during flight, which is illustrated in FIG. 10. A perspective view of an alternative embodiment of aircraft 301 is shown. Aircraft 1001 is substantially similar in form and function to aircraft 301 and incorporates one or more of the features discussed above.

Aircraft 1001 is further provided with a pitch system 1003 having a hydraulic actuator 1005 and a link system 1007 operably associated with the aircraft transmission 1009. During flight, pitch system 1003 can be activated to pitch the orientation of transmission 1009, which in turn pitches rotor system 1011. In the contemplated embodiment, pitch system 1003 can be with manually or autonomously controlled.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor assembly, comprising:
   a yoke mounted to a rotor mast, the yoke comprising;
      an upper arm and a lower arm that form a space therebetween;

the yoke operably associated with a rotor blade;
a first device and a second device, both the first device and the second device being configured to attach the rotor blade to the yoke, the first device being located between the second device and the rotor mast;
a first elastomeric pad disposed on the lower arm;
a second elastomeric pad disposed on the upper arm;
a spindle attached to both the first device and the second device; and
a cuff attached to the spindle and configured to extend at least partially around both the upper arm and the lower arm of the yoke;
wherein the first device and the second device are positioned within the space between the upper arm and the lower arm;
wherein the spindle is attached to the cuff;
wherein the first device is disposed between the first elastomeric pad and the second elastomeric pad; and
wherein the rotor blade attaches to the yoke via the spindle and cuff.

2. The rotor assembly of claim 1, wherein the first device and the second device create a stiff out-of-plane rotation and a soft in-plane rotation of the rotor assembly.

3. The rotor assembly of claim 1, wherein the cuff is free to rotate around both the upper arm and the lower arm.

4. The rotor assembly of claim 1, wherein the first device is a radial bearing disposed between the first elastomeric pad and the second elastomeric pad.

5. The rotor assembly of claim 1, wherein the first device is elastically attached to the yoke.

6. The rotor assembly of claim 1, wherein the first device is a lead/lag damper.

7. The rotor assembly of claim 1, wherein the first device is aligned with the second device about a pitch-change axis.

8. The rotor assembly of claim 1, wherein the second device is a centrifugal damper.

9. The rotor assembly of claim 1, wherein the first device is configured to allow transverse movement of the rotor blade about a chord axis and rotational movement about a pitch-change axis.

10. The rotor assembly of claim 1, further comprising:
a pitch horn attached to the spindle.

11. The rotor assembly of claim 9, wherein the second device is configured to allow rotational movement of the rotor blade solely about the pitch-change axis.

12. An aircraft, comprising:
a rotor system, having:
 a first rotor assembly, comprising;
  a yoke mounted to a rotor mast, the yoke being operably associated with a rotor blade;
  a first device and a second device, the first device being located between the second device and the rotor mast, both the first device and the second device being configured to attach the rotor blade to the yoke via a cuff located entirely external to the yoke; and
  a spindle located between the first device and the second device;
  wherein the first device is mounted to the yoke between a first elastomeric pad and a second elastomeric pad;
  wherein the first elastomeric pad is disposed on a lower arm of the yoke and the second elastomeric pad is disposed on an upper arm of the yoke; and
  wherein the first device is configured to allow transverse movement of the rotor blade about a chord axis and rotational movement about a pitch-change axis; and
 a second rotor assembly coaxially aligned with the first rotor assembly;
 wherein the spindle is attached to the cuff.

13. The aircraft of claim 12, further comprising:
an engine for driving the rotor system;
a transmission; and
a pivot system operably associated with the transmission and configured to pivot the transmission, thereby pivoting the rotor system during flight;
wherein the rotor mast is rotatably coupled to the transmission and operably associated with the rotor system.

14. The aircraft of claim 13, the pivot system comprising:
a driver; and
a link system operably associated with the driver and configured to pivot the transmission.

15. The aircraft of claim 12, the first rotor assembly comprising:
wherein the first rotor assembly and the second rotor assembly are configured to remain relatively stiff in an out-of-plane rotation plane so as to avoid contact with each other;
wherein the first rotor assembly and the second rotor assembly are configured to remain relatively soft in an in-plane rotation plane so as to allow compensation for in-plane loads during flight;
wherein the second device is configured to allow rotational movement of the rotor blade solely about the pitch-change axis; and
wherein the first device and the second device create the stiff out-of-plane rotation and the soft in-plane rotation of the first rotor assembly.

16. A method, comprising:
attaching a yoke to a rotor mast;
attaching the yoke to a first rotor blade with a first cuff extending externally about the yoke;
attaching the yoke to the first rotor blade with a spindle located between a first device and a second device, the first device being located between the second device and the rotor mast, the first device being held between a first elastomeric pad and a second elastomeric pad;
attaching the first cuff to the spindle;
rotating the first rotor blade about a first plane of rotation;
retaining a relatively stiff out-of-plane rotation of the first rotor blade during flight; and
retaining a relatively soft in-plane rotation of the first rotor blade during flight;
wherein the first elastomeric pad is disposed on a lower arm of the yoke and the second elastomeric pad is disposed on an upper arm of the yoke.

17. The method of claim 16, further comprising:
damping motion between the first rotor blade and the yoke with the first device and the second device.

18. The method of claim 17, further comprising:
co-axially rotating a second rotor blade about a second plane of rotation;
retaining a relatively stiff out-of-plane rotation of the second rotor blade during flight; and
retaining a relatively soft in-plane rotation of the second rotor blade during flight;
wherein the relatively stiff out-of-plane rotation prevents contact between the first rotor blade and the second rotor blade during flight; and
wherein the soft in-plane rotation compensates for in-plane loads during flight.

* * * * *